United States Patent [19]

Hanyu et al.

[11] 4,412,669
[45] Nov. 1, 1983

[54] FEED-CONTROL VALVE WITH CONTRACTABLE TUBE

[76] Inventors: Yoshiyuki Hanyu, 71-23 Toyoni, Kashiwa-shi, Chiba-ken; Yasuaki Takekoshi, 1-25-8 Midori, Sumida-ku, Tokyo, both of Japan

[21] Appl. No.: 329,525

[22] Filed: Dec. 10, 1981

[30] Foreign Application Priority Data

Dec. 11, 1980 [JP] Japan ............................. 55-175169

[51] Int. Cl.³ ............................................. F16L 55/14
[52] U.S. Cl. ....................................... 251/4; 251/212; 251/294
[58] Field of Search ...................... 251/212, 7, 4, 5, 8, 251/294

[56] References Cited

U.S. PATENT DOCUMENTS

| | | | |
|---|---|---|---|
| 2,434,835 | 1/1948 | Colley | 251/121 |
| 3,383,131 | 5/1968 | Rosfelder | 251/4 X |
| 4,092,010 | 5/1978 | Carlson, Jr. | 251/212 X |
| 4,094,492 | 6/1978 | Beeman et al. | 251/212 |

Primary Examiner—Alan Cohan
Assistant Examiner—Sheri Novack
Attorney, Agent, or Firm—Eric P. Schellin

[57] ABSTRACT

A feed-control valve for use in a pipe for pneumatically conveying a granular material or transporting a sticky liquid comprises a tubular valve housing, a valve ring having the same inside diameter as that of the tubular valve housing and angularly movably disposed therein, a plurality of flexible, strong and highly stretch resistant and cord spans connected between the valve housing and the valve ring at substantially equally spaced angular positions along their inner surfaces and each span having a length which is substantially the same as the inside diameter of the valve housing or valve ring, and a flexible and strong inner tube mounted in the valve housing and the valve ring and disposed radially inwardly of the plurality of cord spans. The inner tube can be contracted or squeezed radially inwardly by the cord spans from a fully-open position to a fully-closed position in response to angular movement of the valve ring with respect to the valve housing.

10 Claims, 9 Drawing Figures

FEED-CONTROL VALVE WITH CONTRACTABLE TUBE

BACKGROUND OF THE INVENTION

1. Field of the Invention

The present invention relates to a feed-control valve for attachment to an inlet or discharge port in a container or hopper for containing grain such as rice or wheat, particles such as pellets of plastics or tablets, or powdery material such as wheat or coffee powder.

2. Description of the Prior Art

Known valves for use in an inlet or discharge port in a container or hopper for containing granular powdery material include a mechanically operated valve body, which is liable to malfunction due to deposits or jamming of the grainy or powdery material. The prior valves are disadvantageous in that they are awkward to maintain and clean especially when to change the kind of a material to be conveyed. The valves are complex in structure because of a required degree of sealing against leakage, require a number of steps to assemble, and are expensive to construct.

There has been an attempt to develop a valve which has a flexible inner tube that can be contracted or squeezed radially inwardly in a direction to close a passage through the inner tube. However, a means for squeezing the inner tube has been unsatisfactory in that it fails to close the passage completely against leakage.

SUMMARY OF THE INVENTION

It is an object of the present invention to provide a feed-control valve having a flexible inner tube contractable radially inwardly by a plurality of flexible cord spans which can be forced against the inner tube in response to angular movement of a valve ring for completely closing a passage through the inner tube.

Another object of the present invention is to provide a feed-control valve which has an inner tube contractable from a fully-open position to a fully-closed position by angularly moving a valve ring substantially through 90 degrees, and hence which can be driven in automatic applications by a pneumatic actuator or other actuators having a rectilinearly movable member.

Still another object of the present invention is to provide a feed-control valve having a radially inwardly contractable tube which can easily be replaced upon damage thereto or for handling a different kind of material.

Still another object of the present invention is to provide a feed-control valve which is relatively simple in construction, lightweight, small in size, and inexpensive to construct.

According to the present invention, there is provided a feed-control valve comprising a tubular valve housing, a valve ring having the same inside diameter as that of the tubular valve housing and angularly movably disposed therein, a plurality of flexible strong and highly stretch resistant cord spans connected between the valve housing and the valve ring at substantially equally spaced angular positions along their inner surfaces of the valve housing and the valve ring, and each span having a length which is substantially the same as the inside diameter of the valve housing or valve ring, and a flexible and strong inner tube mounted in the valve housing and the valve ring and disposed radially inwardly of the plurality of cord spans, whereby the inner tube can be contracted radially inwardly by the cord spans from a fully-open position to a fully-closed position in response to angular movement of the valve ring with respect to the valve housing.

The above and other objects, features and advantages of the present invention will become more apparent from the following description when taken in conjunction with the accompanying drawings in which certain preferred embodiments of the invention are shown by way of illustrative example.

BRIEF DESCRIPTION OF THE DRAWINGS

FIG. 7 is a cross-sectional view taken along line VII—VII of FIG. 6a.

DETAILED DESCRIPTION OF THE PREFERRED EMBODIMENT

As shown in FIGS. 1 through 4, a feed-control valve comprises a tubular valve housing 1 including axially separate upper and lower housing members 2, 3, and a valve ring 5 disposed between the upper and lower housing members 2, 3 as assembled together. The upper housing member 2 includes an annular wall 21 having on its lower portion a flange 22. The lower housing member 3 includes an arcuate wall 30 having an inside diameter which is slightly larger than the outside diameter of the annular wall 21, there being an annular slot extending between ends of the annular wall 30 through an angle θ (FIG. 3) through which the valve ring 5 is angularly movable. The valve ring 5 has a handle 51 projecting radially outwardly therefrom through the annular slot and confined in angular motion by and between the ends of the annular wall 30. The upper and lower housing members 2, 3 as assembled are aligned in concentric relation with an upper edge of the annular wall 30 being held against a lower surface of the flange 22. The annular wall 30 has a plurality of threaded holes 35 located at angular intervals and held in alignment with through holes 25 defined in the flange 22. The upper and lower housing members 2, 3 are coupled together by screws 4 threaded through the through holes 25 into the threaded holes 35.

Figure 2A:
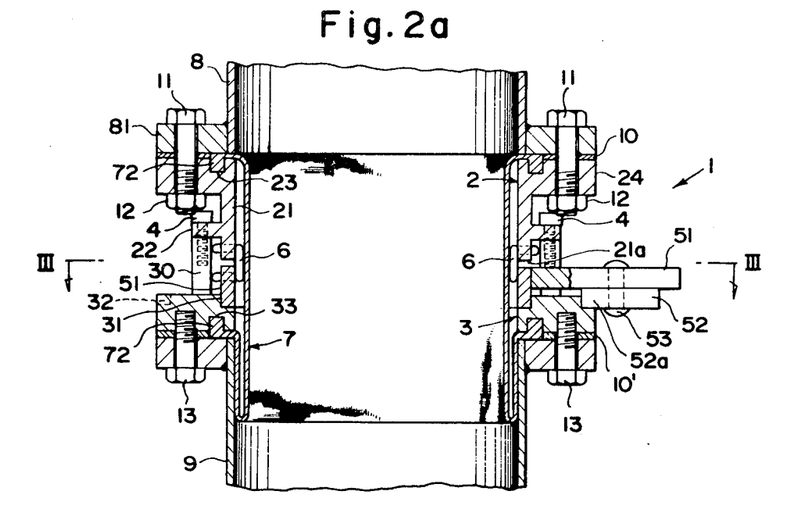
FIGS. 2a and 2b are axial cross-sectional views of the feed-control valve shown FIG. 1, illustrating a fully-open position and a position immediately prior to a fully-closed position, respectively, of the valve.
Figure 2B:
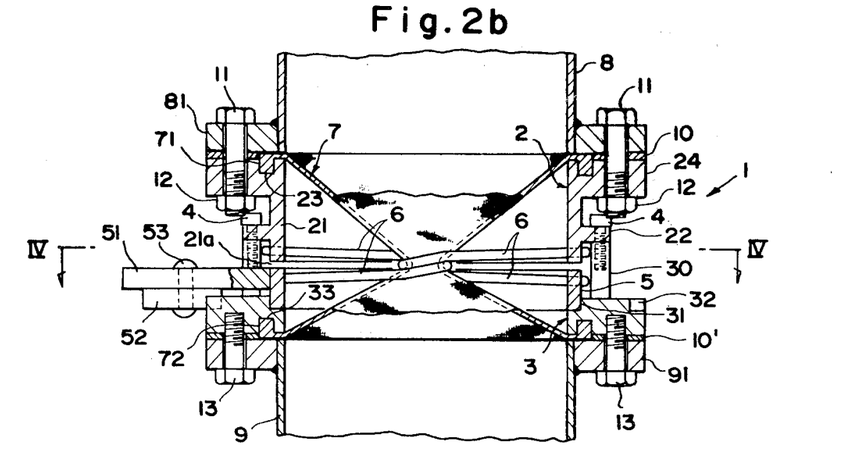
Figure 3:
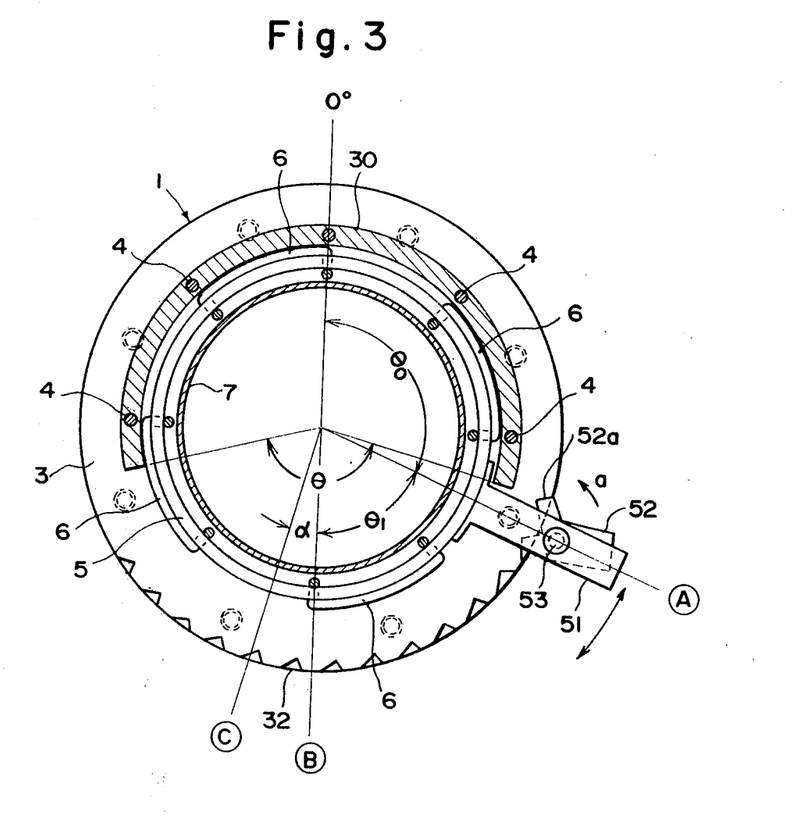
FIGS. 3 and 4 are cross-sectional views taken along lines III—III of FIG. 2a and IV—IV of FIG. 2b, respectively.
Figure 4:
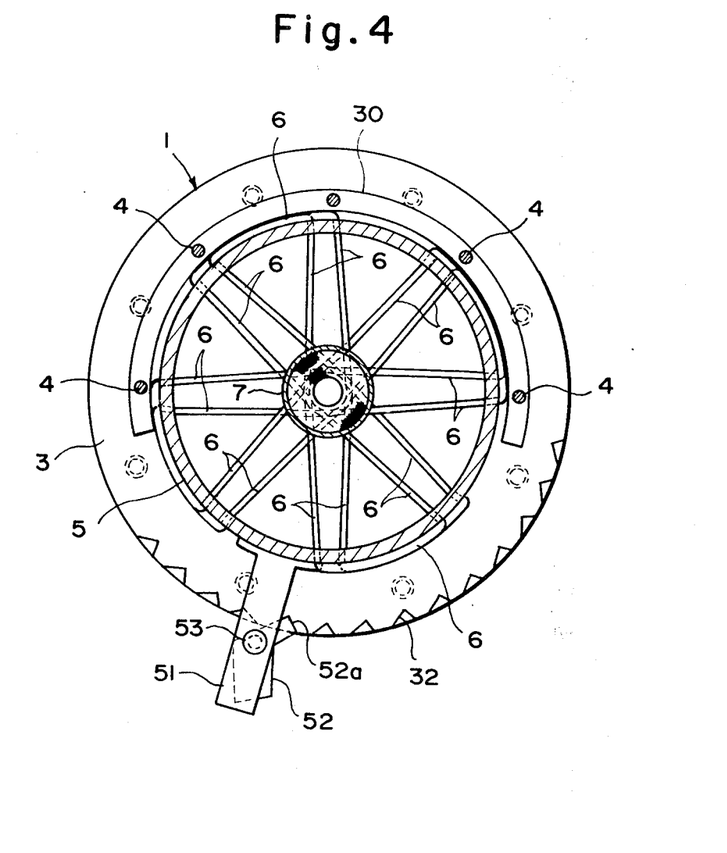

The valve ring 5 has the same inside diameter and thickness as that of the annular wall 21 of the upper housing member 2. The valve ring 5 is fitted angularly movably in an annular step 31 defined around an axial opening in the lower housing member 3. With the valve housing 1 put together, the valve ring 5 is retained in an annular guide recess defined between the annular step 31 and a lower edge of the annular wall 21, there being a slight clearance between the valve ring 5 and the lower edge of the annular wall 21 (FIGS. 2a and 2b).

The inner surface of the annular wall 21 has a plurality (eight in the illustrated embodiment) of holes $27_1$–$27_8$ defined therethrough at angularly equally spaced locations and positioned downwardly of the flange 22. The inner surface of the valve ring 5 also has a plurality (eight in the illustrated embodiment) of holes $55_1$–$55_8$ defined therethrough at angularly equally spaced locations and positioned substantially axially centrally. A single long cord 6 is threaded through these holes alternately successively, e.g., from $27_1$ to $55_1$ to $55_2$ to $27_2$ to $27_3$ to $55_3$ and so on. Thus, the single cord 6 as threaded provides a plurality of parallel stretches or spans extending within the upper housing member 2 and the valve ring 5, the spans between hole pairs $27_1$ and $55_1$, $27_2$ and $55_2$, $27_3$ and $55_3$ and so forth each having a length substantially equal to the inside diameter of the valve ring 5 or the annular wall 21, or more precisely to a diametrical distance between one pair of holes, such as $27_1$ and $55_1$ as they are angularly spaced 180 degrees apart from each other. Thus, the upper housing member 2 and the valve ring 5 are connected to each other by the cord 6. Instead of the single cord 6, a plurality of separate cords each having a length as defined above may be used to connect the upper housing member 2 and the valve ring 5 by passing their ends through the holes.

The cord 6 should be sufficiently strong and resistant to stretching under tension, and flexible enough to avoid any damage to an inner tube 7 (described later). The cord 6 may preferably be made of braided threads.

Figure 1:
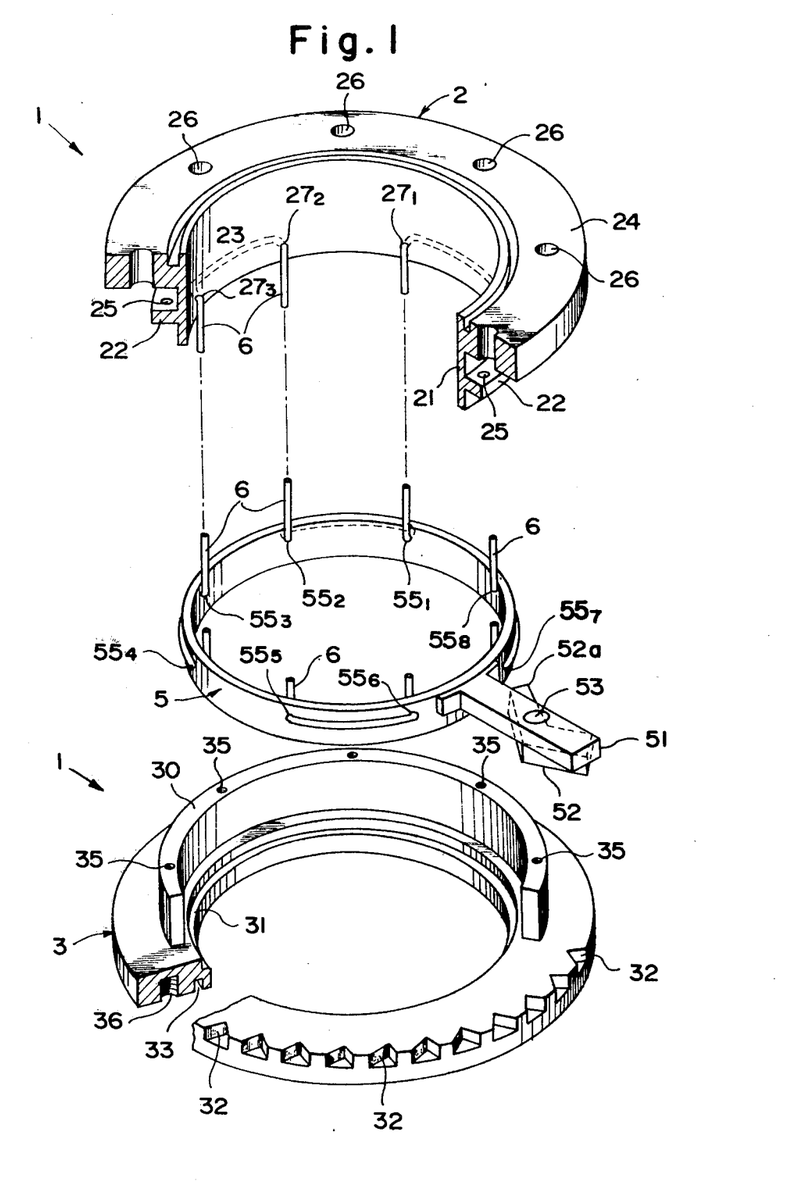
FIG. 1 is an exploded perspective view of a feed-control valve according to an embodiment of the present invention.

It is now assumed that the valve housing 1 and the valve ring 5 are not angularly moved relatively to each other when the corresponding pairs of holes, such as $27_1$ and $55_1$ are axially aligned with one another as shown in FIG. 1. The valve is in a fully-open position A when the valve ring 5 is angularly moved through an angle $\theta_0$ ($d/\pi d = \theta_0/360$ degree where d is the inside diameter, and hence $\theta_0 = 114$ degrees) at which time the spans of the cords 6 between the pairs of the holes are held against the inner surfaces of the annular wall 21 and the valve ring 5 throughout their lengths. In such a fully-open position, the handle 51 of the valve ring 5 engages one of the ends of the arcuate wall 30 which define the arcuate slot therebetween.

The inner tube 7 is mounted in the valve housing 1 and the valve ring 5 and is disposed radially inwardly of the cord spans. The starting position of the valve ring 5 is set at the position A since the cord spans have no squeezing effect on the inner tube 7 while the valve ring 5 angularly moves through the angle $\theta_0$. The inner tube 7 starts being squeezed radially inwardly by the cord spans as the valve ring 5 begins to rotate beyond the angle $\theta_0$. Therefore, an angle through which the valve ring 5 has to move angularly is held to a minimum, and hence the valve 5 can be operated with ease.

More specifically, when the handle 51 of the valve ring 5 is angularly moved clockwise (FIG. 3) from the position A to a position B in which the pairs of the holes, such as $27_1$ and $55_1$, are angularly spaced 180 degrees from each other, the stretches of the cord 6 are kept taut diametrically across the center of the valve housing member 1 and the valve ring 5, running across each other centrally of the valve housing 1 and squeezing or contracting the inner tube 7 equally circumferentially in the radially inward direction. At this time, however, a passage through the inner tube 7 is not completely closed due to elastic resistance of the inner tube 7, flexibility of the cord 6, pressure of the material flowing through the inner tube 7, and other factors. When the handle 51 is continuously moved angularly beyond the position B through an angle $\alpha = 10$ to 15 degrees (thus, 75 to 81 degrees from the position A) to a position C, the cord spans are forced to bend about the point where they cross each other, thereby jointly contacting the inner tube 7 forcibly to completely block off the passage through the inner tube 7. Since the cord 6 is resistant to longitudinal stretch, it now gives resistance to the rotation of the handle 51, whereupon the valve ring 5 is prevented from being further rotated. With the handle 51 is thus stopped, the operator knows that the valve is now completely closed.

For manual actuation of the valve, the handle 51 has a pawl 52 mounted for angular movement on a pin 53 and normally urged by a torsional spring (not shown) to rotate in the direction of the arrow a (FIGS. 3 and 4), and the valve housing member 3 has a plurality of notches 32 defined in an arcuate surface facing radially outwardly, the pawl 52 being engageable at an end 52a thereof in one of the notches 32 at a time. Thus, the valve ring 5 is allowed to rotate in one direction with respect to the valve housing 1, or the handle 51 can be retained in a selected notch position against counterclockwise (FIG. 4) angular movement by engagement of the pawl 52 with the notches 32.

The pawl 52 and the notches 32 may be dispensed with where an electric motor is used to rotate the valve ring 5 or a pneumatic cylinder is employed to move the valve ring 5 along a rectilinear line. Since the handle 51 is angularly moved within 90 degrees to actuate the valve from a fully-open position to a fully-closed position, a pneumatic cylinder may be arranged such that its body is swingably supported by a trunion with an output shaft coupled to the handle 51. Thus, the valve of the present invention may readily be connected operatively to a power actuator in automatic applications.

The inner tube 7 may be formed of cloth, rubber or synthetic fiber, particularly both woven thereof, which is resistant to stretch, strong, and highly flexible when bent or contracted. The inner tube 7 has on its ends a pair of annular retainer ribs 71, 72 (FIGS. 2a, 2b) that have a sufficient mechanical strength and rigidity. The valve housing 1 has in its upper and lower ends a pair of annular grooves 23, 33 in which the retainer ribs 71, 72 are fitted, respectively. As best shown in FIG. 2a, the inner tube 7 is disposed in the valve housing 1 and the valve ring 5 with the retainer ribs 71, 72 retained in the annular groove 23, 33. When the valve is fully open, the inner tube 7 has a portion thereof dependent within the valve. When the valve is fully closed, the inner tube 7 is kept taut by the squeezing cord 6 as shown in FIG. 2b. Therefore, the inner tube 7 should not be excessively long to prevent loose hanging thereof when the valve is in the fully-closed position.

As illustrated in FIG. 1, the upper housing member 2 has on its upper end a flange 24 for connection to a conveyor pipe 8 (FIGS. 2a and 2b), the flange 24 having a plurality of bolt holes 26 spaced circumferentially from each other. The conveyor pipe 8 and the upper housing member 2 are connected together by bolts 11 extending through a flange 81 of the pipe 8 and the bolt holes 26 and fastened by nuts 12, there being a sheet packing 10 interposed between the flanges 81 and 24. With this arrangement, the annular rib 71 on the upper end of the inner tube 7 is fixed in position between the flanges 81 and 24, and hence the inner tube 7 is coupled to the conveyor pipe 8. The lower housing member 3 has in its lower face a plurality of threaded blind holes 36 spaced circumferentially from each other. A conveyor pipe 9 connected to a discharge port in a hopper, for example, is connected endwise to the lower housing member 8 by machine screws 13 threaded into the threaded blind holes 36 with a sheet packing 10' being interposed between the housing member 3 and a flange 91 of the pipe 9. The retainer rib 72 on the lower end of the inner tube 7 is secured in position between the lower housing member 3 and the flange 91 of the pipe 9, and hence the inner tube 7 is connected to the pipe 9. The inner tube 7 may easily be replaced by disconnecting the valve from the pipes 8, 9. The bolt holes 26 and the threaded blind holes 36 are respectively eight in number in the illustrated embodiment and angularly equally spaced to provide secure connection to the conveyor pipes 8, 9.

Figure 5:
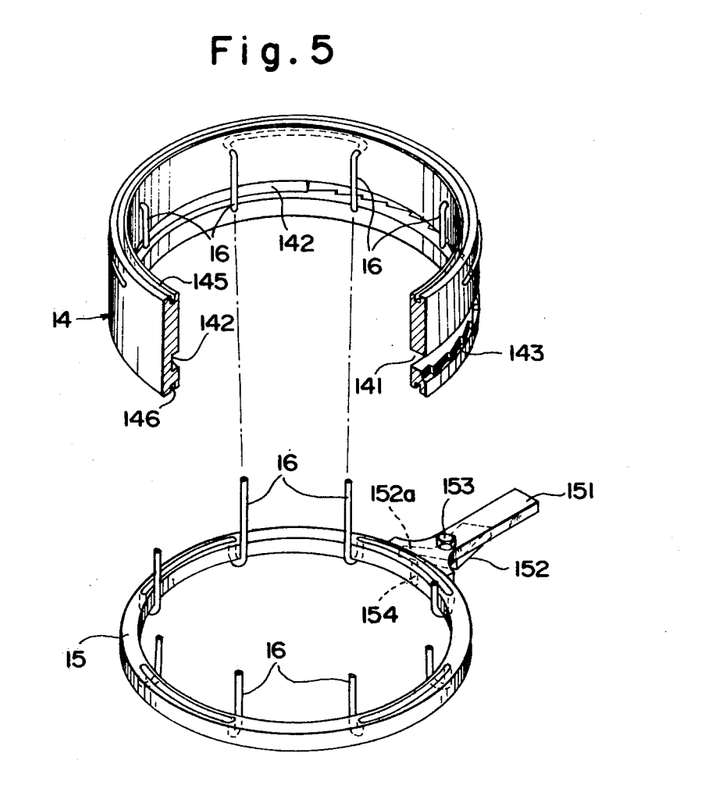
FIG. 5 is an exploded perspective view of a feed-control valve according to another embodiment of the present invention.
Figure 6A:
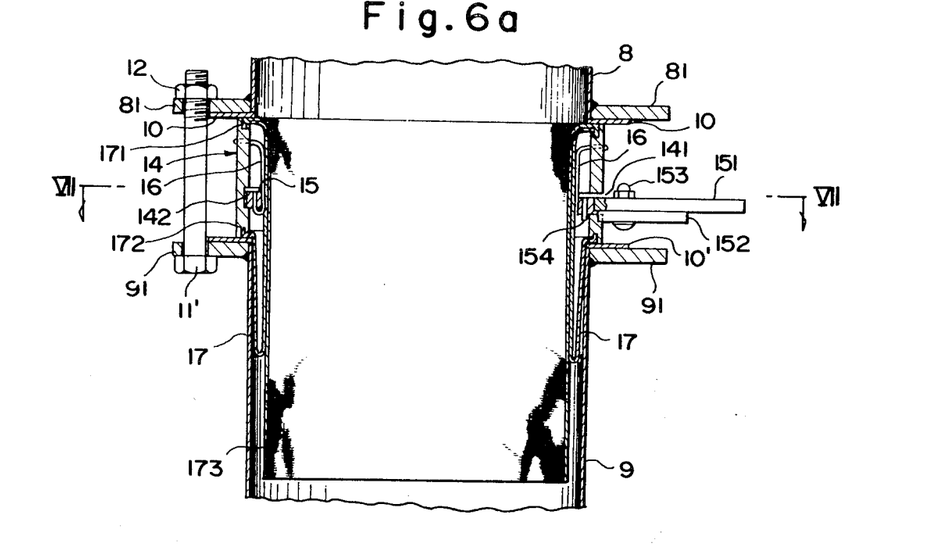
FIGS. 6a and 6b are axial cross-sectional views of the feed-control valve illustrated in FIG. 5, showing a fully-open position and a position immediately prior to a fully-closed position, respectively, of the valve.
Figure 6B:
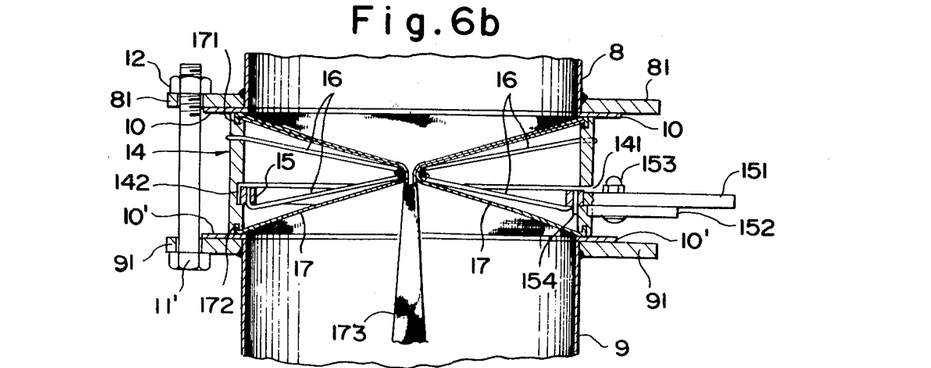
Figure 7:
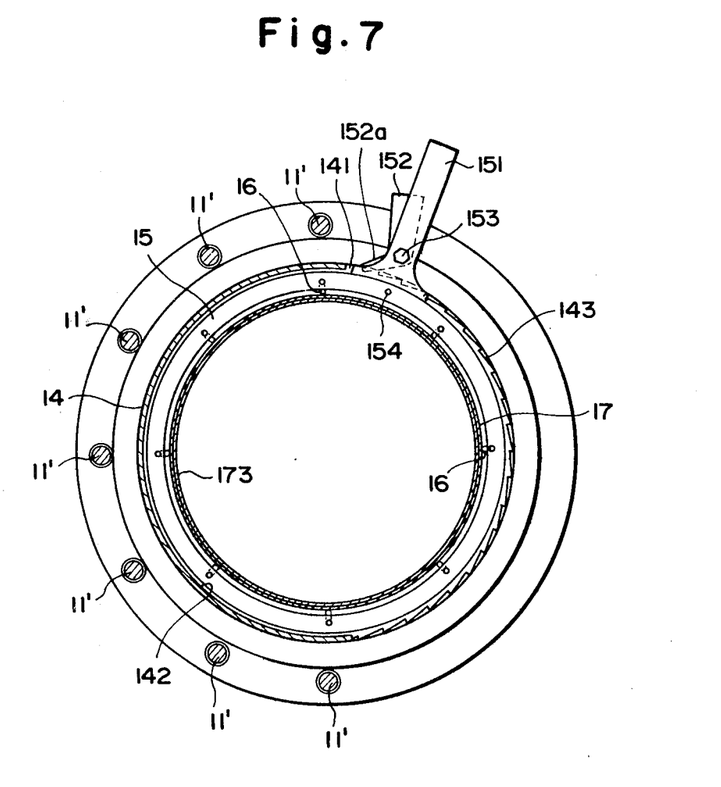

According to another embodiment shown in FIGS. 5 through 7, a valve housing 11 comprises a single unitary tubular body having in its lower portion an arcuate slot 141 having a suitable width in the axial direction of the valve housing 14, and an annular guide recess 142 having substantially the same width as that of the slot 141 and held in radial alignment therewith. A valve ring 15 having a radial handle 151 is inserted through the slot 141 into the recess 142 and is rotatably retained in the recess 142, the valve ring 15 having an outside diameter which is substantially the same as the diameter of the arcuate recess 142. The handle 151 is angularly movable through the arcuate slot 141 through an angle defined thereby. A spring pin 154 extends axially through the valve ring 15 at a position adjacent to the handle 151 and projects into sliding contact with an inner peripheral surface of the valve housing 14. Thus, the spring pin 154 serves as both a guide for the rotation of the valve ring 15 and a stop for preventing the latter from being pulled out of the valve housing 14. The handle 151 supports thereon a pawl 152 mounted by a pin 153 and has an end 152a engageable with one at a time of notches 143 defined in a bottom edge of the arcuate slot 141 in the valve housing 14 along an outer periphery thereof.

The valve housing 14 and the valve ring 15 are coupled with each other by stretches of a cord 16 passing through holes defined in the valve housing 14 and the valve ring 15 at angularly equally spaced locations along peripheries thereof, each of the cord stretches having a length substantially equal to the inside diameter of the valve housing 14 or valve ring 15. As shown in FIG. 6a, a flexible double-layer inner tube 17 is mounted in the valve housing 14 and is disposed radially inwardly of the cord 16. The double-layer inner tube 17 has upper and lower retainer ribs 171, 172 fitted in annular grooves 145, 146 defined respectively in upper and lower edges of the valve housing 14, there being an inner tube member 173 turned radially inwardly from the upper retainer rib 171 and dependent downwardly to the extent that provides a double-walled construction.

The valve housing 14 has no flange for connection to conveyor pipes. Instead, upper and lower pipes 8, 9 are connected endwise to the valve housing 14 by bolts 11' extending through flanges 81, 91 of the pipes 8, 9 and fastened by nuts 12. There are sheet packings 10, 10' interposed between the flanges 81, 91 and the valve housing 14. This arrangement enables the retainer ribs 171, 172 to be secured in position, and the pipes 8, 9 to be coupled to the valve housing 41 in an airtight relation.

The double-layer inner tube 17 is advantageous especially in applications where a high degree of sealing is required against leakage or entry of foreign matter from the exterior as in plants in chemical or pharmaceutical industry.

Although some preferred embodiments have been shown and described in detail, it should be understood that many changes and modifications may be made therein without departing from the scope of the appended claims.

What is claimed is:

1. A feed control valve comprising:
   a tubular valve housing comprises a tubular wall having an annular guide recess, an inner surface, and an outer surface;
   a valve ring angularly movably fitted in said annular guide recess and having an inner surface corresponding to the inner surface of said valve housing;
   a plurality of flexible, strong and highly stretch-resistant cord spans connected between said tubular valve housing and said valve ring at substantially equally spaced angular positions along the inner surfaces of said valve housing and said valve ring,
   a flexible and strong inner tube having axial ends and mounted in said valve housing and said valve ring and disposed radially inwardly of said plurality of cord spans, said inner tube having annular retainer ribs on said axial ends thereof;
   said valve housing having annular grooves in which said annular retainer ribs are fitted;
   said valve ring having a handle projecting radially outwardly therefrom for angularly moving said valve ring with respect to said valve housing to enable said cord spans to contract said inner tube radially inwardly from a fully-open position to a fully-closed position;
   said valve housing having an arcuate slot through which said handle extends out of said valve housing, whereby said valve ring is angularly movable through an angle defined by said arcuate slot.

2. A feed control valve according to claim 1, wherein said outer surface of said valve housing has notches, said handle of said valve ring is provided with a pawl which selectively engages said notches to retain said handle in the desired angular position with respect to said valve housing.

3. A feed control valve according to claim 2, further comprising flanges that are mounted on the valve housing for connection to external pipes.

4. A feed control valve according to claim 3, wherein each of said cord spans have a length which is substantially the same as the inside diameter of said tubular valve housing.

5. A feed control valve according to claim 3, wherein each of said cord spans have a length which is substantially the same as the inside diameter of the valve ring.

6. A feed control valve according to either claim 4 or 5, wherein said valve ring has the same inside diameter and thickness as said tubular wall of said valve housing.

7. A feed control valve according to claim 6, wherein said tubular valve housing comprises an upper housing member and a lower housing member joined in concentric relation, said lower housing member having said annular guide recess.

8. A feed control valve according to claim 7, wherein said upper housing member and said valve ring have a plurality of pairs of holes, said cord spans comprising a single cord passing successively through said holes and extending parallel to each other.

9. A feed control valve according to claim 6, wherein said valve housing comprises a unitary tubular body having said annular guide recess in which said valve ring is angularly movably fitted, and said arcuate slot communicates with said annular guide recess and through which said valve ring is insertable into said annular guide recess.

10. A feed control valve according to claim 9, wherein said inner tube comprises a flexible and strong outer tube member mounted in said valve housing and said valve ring and disposed radially inwardly of said plurality of said cord spans, and an inner tube member disposed radially inwardly of said outer tube member.

* * * * *